United States Patent [19]

Fettes et al.

[11] Patent Number: 5,775,634
[45] Date of Patent: Jul. 7, 1998

[54] LATCHING RECYCLABLE MOTION PICTURE REEL

[75] Inventors: Ian Fettes, Newport Beach; Ranjiv Goonetilleke; Cesar Fernandez, both of Paramount, all of Calif.

[73] Assignee: Circular Motion Products, Paramount, Calif.

[21] Appl. No.: 845,165

[22] Filed: Apr. 21, 1997

Related U.S. Application Data

[63] Continuation-in-part of Ser. No. 632,061, Apr. 15, 1996, Pat. No. 5,676,332.

[51] Int. Cl.$^6$ .................................................. B65H 75/14
[52] U.S. Cl. .................................................. 242/608.6
[58] Field of Search .............................. 242/608, 608.2, 242/608.6, 609, 609.1, 118.6

[56] References Cited

U.S. PATENT DOCUMENTS

| | | | |
|---|---|---|---|
| 1,429,692 | 9/1922 | Passavanti | 242/608.2 |
| 2,667,257 | 1/1954 | Hurtado | 242/608.6 |
| 2,778,581 | 1/1957 | Lorenz | 242/609 |
| 3,041,005 | 6/1962 | Wallace | 242/609.1 |
| 3,145,823 | 8/1964 | Spradlin | 242/608 |
| 3,173,536 | 3/1965 | Gittler et al. | 242/609.1 |
| 4,515,323 | 5/1985 | Rood et al. | 242/609 |
| 4,610,555 | 9/1986 | DiLuco | 242/608.2 |
| 4,629,136 | 12/1986 | Vallance | 242/608.6 |
| 5,114,089 | 5/1992 | Posso | 242/608.6 |
| 5,531,399 | 7/1996 | Weisburn et al. | 242/608.6 |

FOREIGN PATENT DOCUMENTS

| | | | |
|---|---|---|---|
| 1 211 461 | 2/1966 | Germany | 242/608.2 |
| 1-98575 | 4/1989 | Japan | 242/608.6 |

*Primary Examiner*—John P. Darling
*Attorney, Agent, or Firm*—Charles H. Thomas

[57] ABSTRACT

A motion picture film reel is constructed so as to be readily disassembled into its component parts to permit film to be removed therefrom without breaking the component parts of the reel. Furthermore, the component parts of the film reel can be rapidly reassembled for repeated reuse. Moreover, the structure is completely plastic so that it may be melted down and is totally recyclable. The film reel is comprised of a pair of side retainers that are releasably engaged with a disk-shaped hub. Each of the side retainers has a pair of posts with catches on the ends thereof which may be inserted through post receiving apertures in a transverse web in the hub. The posts are also provided with cam surfaces which interact with each other to hold the catches engaged with the web. A latching mechanism immobilizes the side retainers relative to each other and relative to the hub until or unless released.

16 Claims, 10 Drawing Sheets

LATCHING RECYCLABLE MOTION PICTURE REEL

The present application is a continuation in part of U.S. application Ser. No. 08/632,061, filed Apr. 15, 1996, now U.S. Pat. No. 5,676,332.

BACKGROUND OF THE INVENTION

1. Field of the Invention

The present invention relates to motion picture reels upon which motion picture film is wound and unwound as it is passed through a motion picture projector for presentation of a motion picture to a viewing audience.

2. Description of the Prior Art

Motion pictures are created by a series of photographs taken rapidly in sequence and arranged on a length of film. The film is wound on a motion picture reel and fed through a motion picture projector at a predetermined speed that is rapid enough to produce the illusion of actual movement of the figures in the sequence of photographs as the photographs are projected on the screen. The film is wound on the motion picture reel in a helical fashion about a hub that is fixed between a pair of much larger, narrow, planar retaining members. As film is advanced through the projector it is pulled off of one reel, advanced through the projector, and wound on a take-up reel. At the conclusion of presentation of the motion picture, the film is rewound back onto the original reel from which it was drawn during the presentation process.

In the motion picture industry, motion pictures are timed for release at a great number of locations during and immediately following very expensive promotional advertising campaigns. To maximize the number of viewers in the audiences, a great number of copies of a motion picture are created and are then distributed concurrently to numerous different movie theaters at the height of interest created by the advertising campaign. This distribution technique necessitates the creation of a great number of copies of each motion picture at the time of distribution. Each copy requires a separate, dedicated motion picture film reel.

During and immediately following the period of advertising promotion, a motion picture is widely exhibited at many different locations at the same time. Following the promotional period, however, the multitude of copies of the motion picture film produced and previously required are no longer necessary, and indeed, constitute a problem.

It is highly desirable for excess copies of motion picture films to be destroyed rather than stored. Films to be stored for later use must be maintained under hermetically sealed conditions so as to avoid degradation of the film copy. While certainly a limited number of copies of the film are preserved for possible recirculation and for use as masters for the possible reproduction of additional copies at a future time, the great majority of the copies of motion pictures produced are destroyed following a limited period of wide-spread exhibition in movie theaters.

There are several reasons for destroying the many copies of a motion picture film that are no longer required after the initial period following release of the film. The expense of storing the very large number of copies which were once necessary in order to exhibit the motion picture at a multitude of different movie theaters cannot be justified. The cost of protection and storage of each copy of the motion picture film far outweighs the incremental cost of producing another motion picture copy should another copy be required.

Moreover, when copies of motion picture films are stored they must be safeguarded against misappropriation. As a consequence, destruction of the excess number of copies of a motion picture film following release and circulation is a highly desirable alternative to storage.

Originally, motion picture film reels were made of metal. At the time of destruction the motion picture film was drawn off of such a reel and cut into small, unusable pieces for disposal. However, this was a very time consuming, and therefore expensive process.

Because of the lengthy time required to unwind a copy of a motion picture film for destruction, quicker destruction methods were devised. One method was to construct the reel upon which the film was wound of a plastic material that could be broken in order to retrieve the film for destruction without unwinding it when the copy of the film became redundant. As a consequence, the film did not have to be pulled lengthwise off of the reel by rotating the reel for a lengthy period of time, but instead could be pulled transversely off of the hub and destroyed without unwinding it.

However, since the film reel had to be made strong enough to withstand repeated transport and use and reuse during exhibition of the motion picture, the reel had to be constructed in a reasonably sturdy manner. As a result, smashing of the reel was laborious and also at times difficult. Moreover, the cost of replacing these reels for use with other motion picture films was considerable.

More recently, motion picture reels have been produced which are formed of component members that are releasably attached to each other. Each of these conventional members is formed of a broad cheek plate and a portion of a central hub which can be releasably fastened together. Originally the two component portions of the reel were screwed together. When the copy of the motion picture film wound thereon was no longer desired, the components of the reel were unscrewed from each other to provide complete access to the film wound on the central hub. However, the parts of this type of reel could accidentally become unscrewed during the time the film was in distribution.

A further type of motion picture film reel is now being produced in which the two halves of the motion picture reel included interlocking fingers at the hub that flex resiliently to interlock with a corresponding structure projecting from the other half of the reel. These two retaining members each include a metal insert into which a key is inserted. When the key is rotated, the fingers are deflected from engagement with the other portion of the reel, so that the two reel portions can be pulled apart. Each of the reel halves also includes either portions of an integrally formed hub portion upon which the film is wound or a hub insert. In either case a key is necessary to work within the metal insert so as to detach the reel halves from each other.

Furthermore, with this conventional design the metal insert becomes a problem in ultimately disposing of such reels once they have outlived their useful lives. The metal insert cannot be readily separated from the plastic. Therefore, recycling of the plastic portion of the reel, which represents by far the greater portion of the structure of the reel, becomes very difficult since the metal insert must first be removed.

A significant advance in the construction of motion picture film reels was achieved in our prior U.S. patent application Ser. No. 08/632,061, filed on Apr. 15, 1996. That application describes a completely recyclable motion picture film reel, formed completely of plastic and having component parts that are releasably attached together. In the structure of the device of our prior application a pair of side retainers each formed of a generally flat, planar member are provided with a pair of resilient prongs defining catches thereon. These prongs are diametrically opposed to each other and extend through the hollow core of a hub so that the catches at the ends of the prongs releasably engage the far side of the hub. The prongs of each of the side retainers are angularly displaced ninety degrees from the prongs of each other side retainer and pass through channels defined in the base of the other side retainer so that the side retainers are immobilized relative to each other as well as relative to the hub.

The motion picture film reel of our prior invention is quite suitable for smaller reels, such as those in which the flat, planar members of the side retainers have a diameter of about fourteen and one-half inches. However, it has been discovered that for larger reels a different structure is more suitable. Specifically, in our prior motion picture film reel the prongs of each side retainer are located at a distance of about one-half of an inch from the axial center of the reel. Thus, the small moment arm that exists between the reel axis and the fastening prong allows the device to withstand only a limited amount of torsional stress. According to the present invention, on the other hand, a system is employed which provides a significantly greater moment arm from the reel axis for the catches that secure the side retainers to the hub. The film reel is thus able to withstand significantly greater torsional forces than the motion picture film reel of our prior invention, yet retains all of the advantageous features thereof.

SUMMARY OF THE INVENTION

A primary object of the present invention is to provide a motion picture reel which can not only readily be taken apart, but which is also completely recyclable. Motion picture reels of the present invention involve no metal parts whatsoever. To the contrary, the reel of the present invention is formed completely of plastic which can be totally recycled without separation from any metal member at the end of its useful life. Once the reel becomes worn to the point where it is no longer serviceable, the component members of the reel are merely melted down so that the structure of the reel is totally recyclable.

A further object of the invention is to provide a motion picture reel which is completely reusable, over and over again. Unlike some prior systems, the reel of the invention need not be broken in order to remove the film without unwinding it. Quite to the contrary, the component members of the motion picture reel of the invention can be taken apart and reassembled many, many, times, thus giving the reel a greatly enhanced useful life.

A further object of the invention is to produce a motion picture reel in which the retainer members are identical in construction, even though they are oriented relative to a hub disposed therebetween in mirror image fashion. Due to the unique construction of the reel of the invention, the retaining members are releasably connected to a central hub from opposites sides of the hub by orienting structurally identical retaining members initially at equal angular offsets relative to the hub, but in opposite angular directions relative to each other. Both of the retaining components then can be attached to a common hub member from opposite sides of the hub member.

A further object of the invention is to provide a motion picture reel in which the component members of the reel remain releasably attached to each other throughout the use of the reel for transport, storage, and display of a film thereon, but which can also be quickly and easily disassembled from each other without the use of any special purpose tool. Indeed, the component members can be separated from each other without any tools whatsoever, using only a person's fingers.

A further object of the invention is to provide a motion picture reel in which a single hub member may be utilized in conjunction with two identical, retaining members. The two side retaining members for each motion picture film reel can thereby be produced from a single mold.

The motion picture reel can be repeatedly assembled and disassembled without destruction. Moreover, when its useful life is ended it is completely recyclable since it is formed entirely of plastic without metal parts of any type.

In one broad aspect, the present invention may be considered to be a motion picture reel having an axis of rotation and formed of separable and releasably engaged components. These components include a pair of laterally confining retaining members and a disk-shaped hub. Each retaining member includes a planar portion that defines a central, hub-engaging region, concentrically surrounded by a circular peripheral edge. Each retaining member also includes axial elements extending out from the central hub-engaging region and including a pair of diametrically opposed posts. Each post defines a catch thereon that extends parallel to the planar portion and in a first, common angular direction relative to the axis of rotation.

The disk-shaped hub has opposite sides. The hub has a central, cylindrical core, a cylindrical annular rim disposed concentrically about the core, and a transverse web extending between the core and the rim and defining a pair of diametrically opposing post receiving apertures therethrough. These post receiving apertures also serve as guide apertures to align the retaining members in a predetermined angular orientation relative to each other with respect to the axis of rotation and in a mutual facing disposition. The retaining members are on the opposite sides of the hub with their axial elements directed toward the hub so that the posts on each retaining member project through the post receiving apertures from opposite sides of the web. The catches on the posts of each side retaining member therefor extend in opposite angular directions relative to the catches on the posts of the other side retaining member.

Each of the side retaining members is equipped with a latch mechanism that is engageable to hold the catches in overlying relationship relative to the web and to immobilize each of the retaining members relative to the hub.

Preferably each post also defines a cam surface adjacent the catch thereon. The cam surface of each post slopes away from the catch thereon in an opposite, angular direction therefrom relative to the axis of rotation. As a result, when the catches on the posts are aligned with the post receiving apertures and the retaining members are advanced toward the hub and toward each other, the cam surfaces of the posts of the each of the retaining members contact and slide past the cam surfaces of the posts of each other retaining member. The retaining members are thereby twisted slightly so that the catches thereby engage the web at the post receiving apertures therethrough.

The latch mechanisms are preferably both comprised of latch arms having first ends secured to the hub-engaging regions of the planar portions of the retaining members and second free ends. Each of the free ends of each latch arm carries an engagement member extending toward the hub. The hub is provided with rotation limiting members on its opposite sides. These rotation limiting members, which are preferably formed as spokes that extend radially between the core and the annular rim of the hub on both sides of the web, interact with the engagement members at the free ends of the latch arms. This inter-engagement prevents relative rotation between the hub and the retaining members when the latch mechanisms are engaged, since the spokes reside in a rotationally interfering relationship with the engagement members.

Preferably also, the core of the hub is hollow and the hub is provided with a hub locator element formed as a keyway in the internal surface of the core wall. Also, retaining panel locator elements are preferably formed as keys that are narrower than the keyway and extend into the keyway from opposite sides of the hub. The keys are engageable with the keyway only when the retaining members are within a predetermined angular range of alignment relative to the hub. The keyway is wider than each of the keys, however, to provide sufficient side clearance so as to allow each side retaining member to rotate slightly relative to the hub following insertion of the posts into the post receiving apertures to permit the catches at the ends of the posts to engage the web and for the latching mechanism to engage.

In another broad aspect the invention may be defined as a motion picture film reel comprising a pair of retaining members and a disk-shaped hub having opposite sides. Each of the retaining members is formed with a flat side cheek-plate member having a central axis of rotation, an outer circular perimeter, and an inner hub-engaging region concentric relative to the axis of rotation. Each retaining member has a pair of diametrically opposed posts each extending normal to the cheek-plate member and having a catch thereon. The catches extend parallel to the cheek-plate member and at a tangential orientation in a common direction of angular displacement from the posts. Each of the posts further defines a cam surface thereon oriented to face in a direction away from the catch thereon.

The hub has an annular outer cylindrical rim and a transverse web extending radially inwardly therefrom. The web defines a pair of diametrically opposed post receiving apertures therethrough. The retaining members are disposed on the opposite side of the hub with the posts of both of the retaining members projecting through the pair of post receiving apertures from opposite sides of the hub. When the retaining members are engaged with the hub, the cam surfaces of the posts of each of the retaining member reside in contact with the cam surfaces of the posts of the other retaining member. As a result, the catches engage the web from opposite sides thereof adjacent to the post receiving apertures.

The post receiving apertures serve as locator holes. The web prevents engagement of the retaining members with the hub unless the catches on the posts are initially aligned with the post receiving apertures and the retaining members are pressed toward the hub. Advancement of the retaining members toward each other causes the contacting cam surfaces to slide past each other thereby rotating the retaining members into angular alignment with each other.

Preferably the motion picture film reel is provided with a latching element on each of the retaining members in the form of a latch arm having one end fastened to the inner hub-engaging region and an opposite free end. The latching element also includes a blocking member located at the free end of the latch arm. The blocking member extends toward the web. The hub is comprised of at least one spoke or tab extending radially inwardly from the outer cylindrical rim on both sides of the web. The latching element on each of the retaining members is moveable between a latching position in which the blocking member projects from the inner hub-engaging region inwardly toward the hub. The latching element on each of the retaining members is moveable alternatively to a withdrawn, disengaged position in which the blocking member and the spoke do not reside in a rotationally interfering relationship. When the latching element is in the latching position the blocking member resides in abutment against the spoke. Engagement of the latching element with the hub thereby prevents relative movement therebetween.

The invention may be described with greater clarity and particularity with reference to the accompanying drawings.

DESCRIPTION OF THE EMBODIMENT

Figure 1:
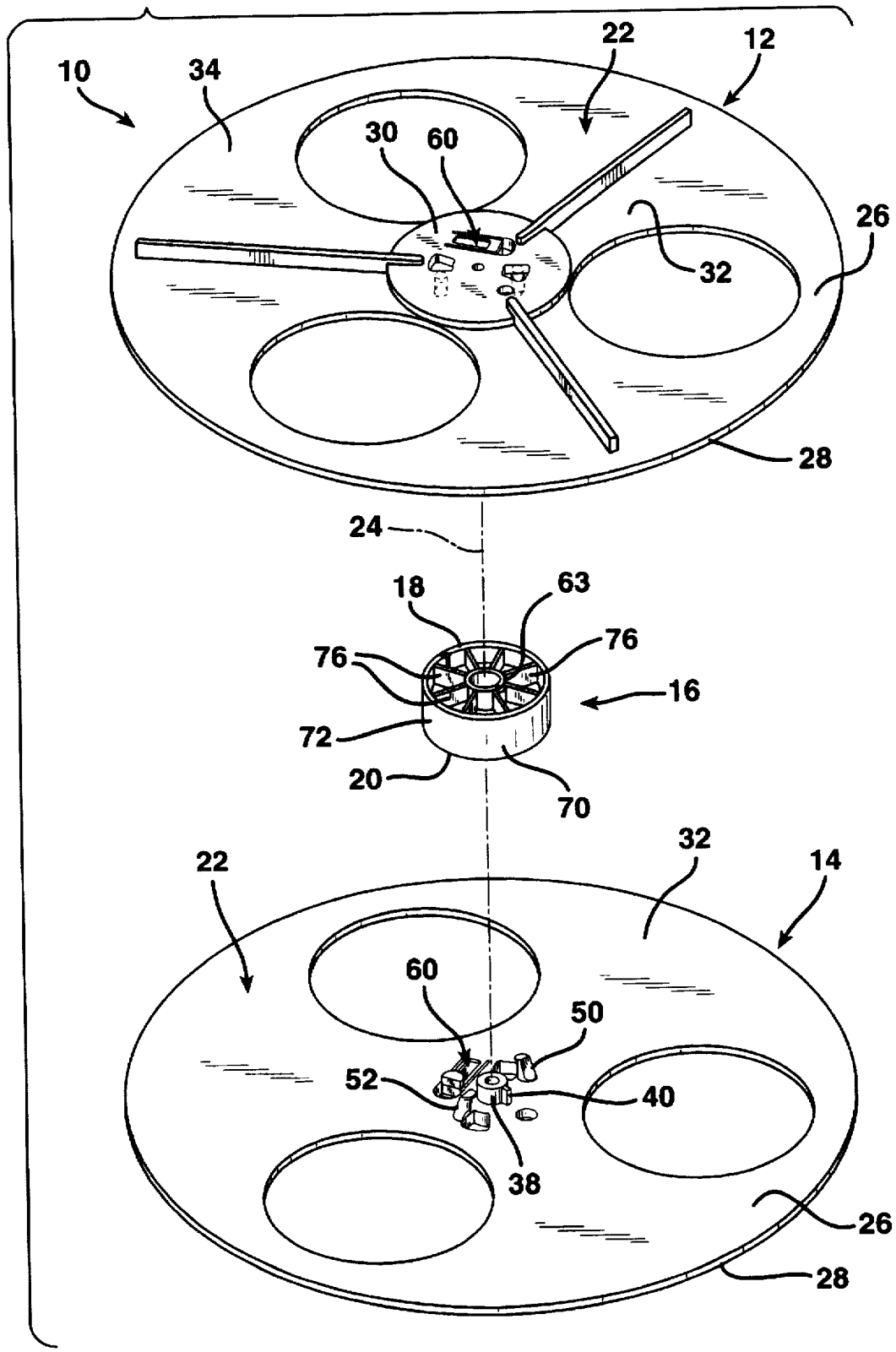
FIG. 1 is an exploded view of one preferred embodiment of a motion picture film reel constructed according to the present invention.
Figure 2:
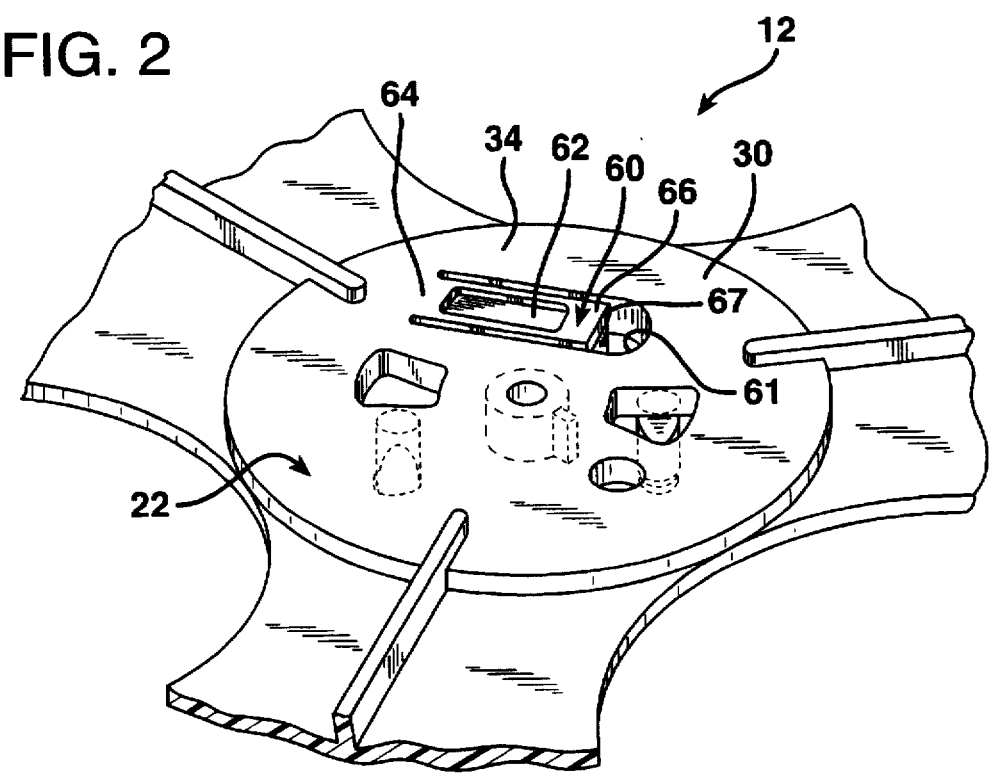
FIG. 2 is a perspective detail of the outer surface of the hub-engaging region of the upper side retainer shown in FIG. 1.
Figure 3:
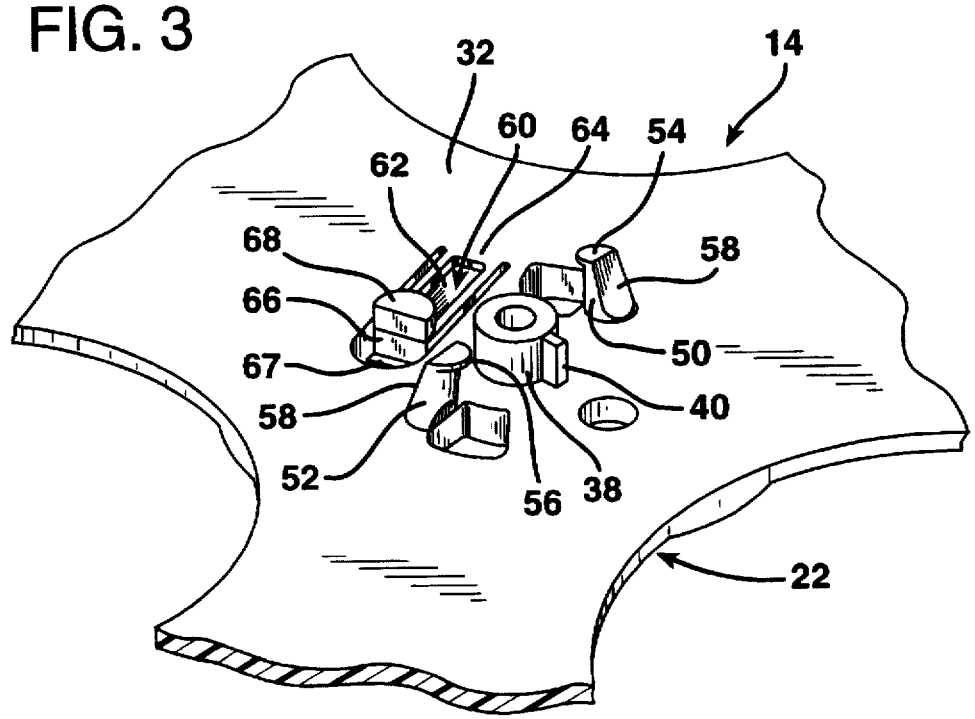
FIG. 3 is a perspective detail of the inner surface of the lower side retainer depicted in FIG. 1.

FIG. 1 illustrates a motion picture film reel indicated generally at 10, comprised of separate components that are releasably engageable together. These components include a pair of side retainers 12 and 14, and a disk-shaped hub 16 located therebetween. The hub 16 has opposite sides 18 and 20. All of the component members 12, 14, and 16 of the motion picture film reel 10 are formed of acronitrilebutadyene-styrene (ABS).

The retaining members 12 and 14 are identical to each other in construction. Each of the retaining members 12 and 14 is formed with a flat, side cheek-plate member 22. Each of the cheek-plate members 22 defines a peripheral region 26 with an outer, circular perimeter 28 defining a central axis of rotation 24 and a central, hub-engaging region 30. The peripheral region 26 is joined to the hub-engaging region 30 by three flat spokes 32, located at one hundred twenty degree intervals about each of the retaining members 12 and 14. The spokes 32 radiate from the hub-engaging region 30 to meet the retaining member peripheral region 26. The circular perimeter 28 of the peripheral rim 26 concentrically surrounds the hub-engaging region 30.

Each of the flat, cheek-plate members 22 has a planar inner surface 32 and a planar outer surface 34. The outer surface 34 of the side retaining member 12 and the inner surface 32 of the side retaining member 14 are visible in FIG. 1.

The hub-engaging region 30 is centered within the perimeter 28 and includes a pair of stiff, rigid posts 50 and 52 that are located diametrically opposite each other. The posts 50 and 52 are centered at a radius of about one inch from the side retainer axis 24 and extend out of the plane of the inner surface 32 of the flat, cheek-plate member 22 a distance of about three-quarters of an inch. Each post 50 and 52 defines thereon a catch 54 and 56 respectively.

Figure 6:
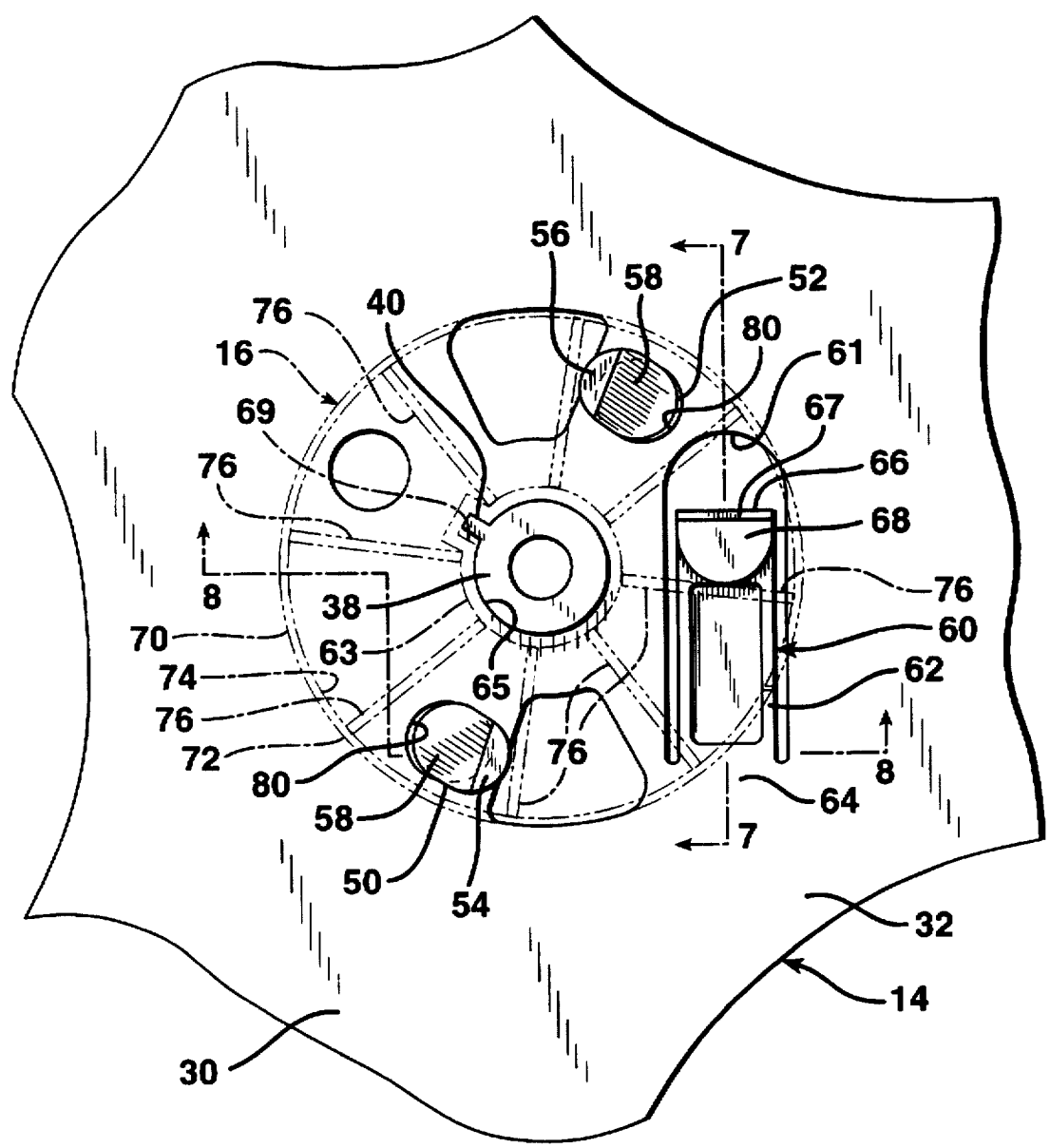
FIG. 6 is a top plan detail taken along the lines 6—6 of FIG. 4.

The catches 54 and 56 are formed as flat, planar tabs. The catches 54 and 56 extend in the same angular direction relative to the side retainer axis 24 with respect to the side retainer cheek plate 22 upon which they are formed. That is, when viewed from the inner surface 32, as illustrated in FIG. 6, the catches 54 and 56 extend from the posts 50 and 52, respectively, in a counterclockwise direction of angular displacement from posts 50 and 52 and at tangential orientation relative to the axis 24. That is, the catches 54 and 56 are oriented perpendicular to an imaginary line extending between the centers of the posts 50 and 52 and passing through the axis 24.

Figure 8:
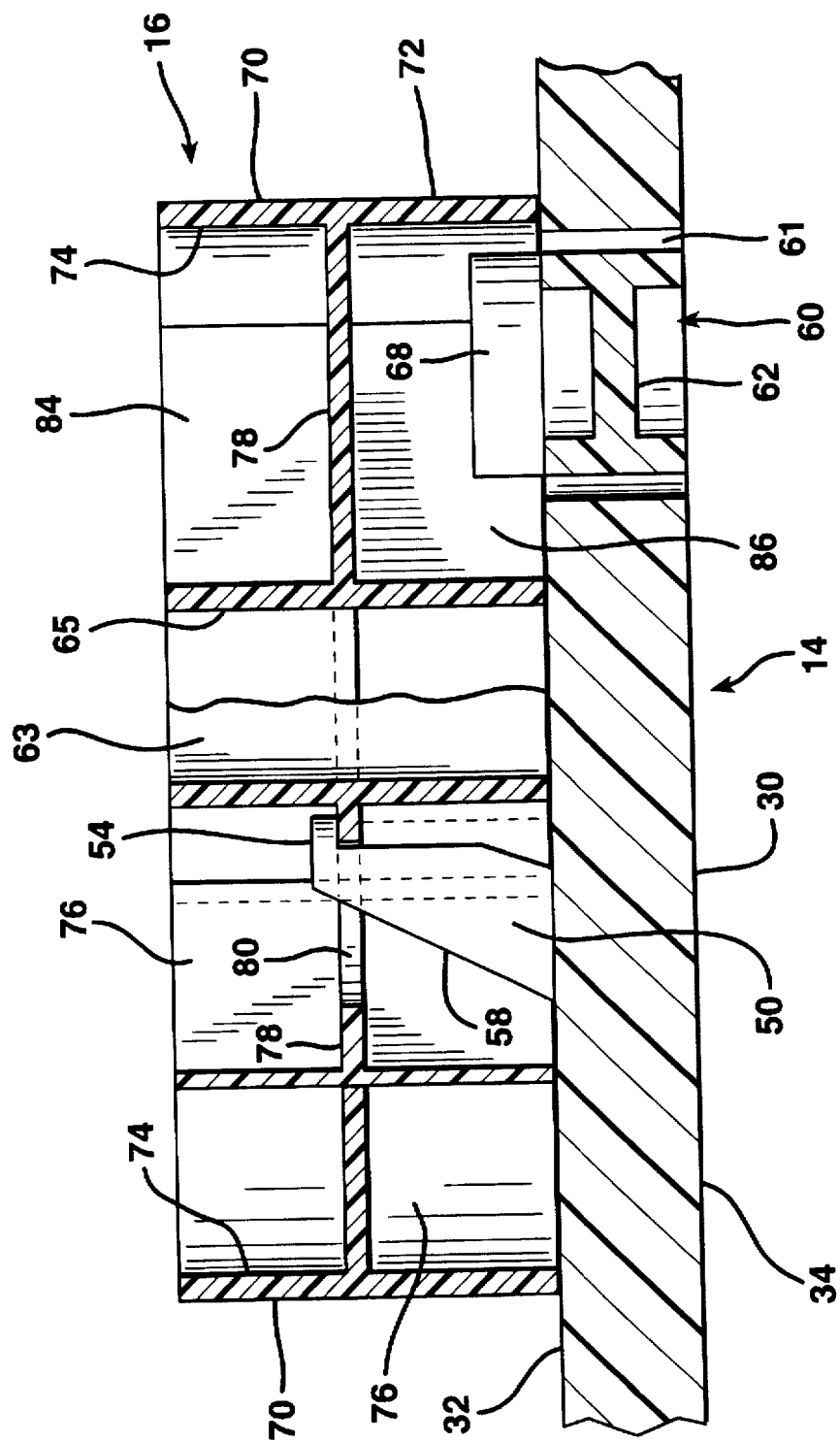
FIG. 8 is a sectional elevational detail taken along the lines 8—8 of FIG. 6.

Each of the posts 50 and 52 also defines a cam surface 58 thereon that slopes away from the catch formed on the post end. The surfaces 58 are inclined relative to the inner surfaces 32 of the cheek plates 22 at an angle of about 60 degrees and are oriented to face in an angular direction opposite the angular direction in which the catches 54 and 56 extend. That is, with reference to FIGS. 6 and 8, the cam surfaces 58 are orientated to face in a clockwise direction relative to the side retainer axis 24, as viewed from above the inner surface 32, while the catches 54 and 56 project from their respective posts 50 and 52 in a counterclockwise direction.

Near the center of each hub-engaging region 30 a cylindrical annular boss 38 projects out of the plane of the inner surface 32 of the cheek-plate member 22. The boss 38 is slightly shorter than the posts 50 and 52 and includes a short, narrow, projecting key 40 extending radially outwardly therefrom. The key 40 is angularly offset ninety degrees from the centers of the posts 50 and 52. The keys 40 extend out of the planes of the inner surfaces 32 of the flat cheek-plate members 22. The keys 40 on the bosses 38 serve as locator elements.

Each of the side retaining cheek-plate members 22 is provided with a latch mechanism that is engageable with the hub 16 to immobilize each of the retaining cheek-plate members 22 relative to the hub 16, and to prevent relevant movement therebetween. Each latch mechanism employed in the embodiment of FIGS. 1-8 includes a latching element 60.

Each of the latching elements 60 is comprised of a resilient latch arm 62 integrally formed from the same structure forming the retaining cheek-plate member 22. Each latch arm 62 has a first end 64 of which is securely anchored to the retaining cheek-plate member 22 with which it is formed. The first, anchored end 64 of each latch arm 62 is fastened to the inner hub-engaging region 30 and is resiliently flexible with respect to the flat, retaining, cheek-plate member 22. At its free end 66, each latch arm 62 carries a blocking member 68, which is formed as a generally flat, semicylindrical-shaped lug that normally projects out of the plane of the inner surface 32 the retaining cheek-plate member 22. The rounded end of the blocking member 68 faces the anchored or fixed end 64 of the latch arm 62.

Each of the latching elements 60 is formed within a latching element opening 61 in each of the cheek-plate members 22, as best depicted in FIG. 6. The opening 61 is narrow along the sides of the latch arm 62, but is rounded and extends a considerable distance beyond the free end 66 thereof. At its extremity the free end 66 of the latch arm 62 forms a narrow, finger grip ledge 67 that projects from the free end 66 away from the fixed end 64 of the latch arm 62 just beyond the blocking member 68.

The hub 16 is formed with a central, generally cylindrical annular core 63 through which a central, axial opening 65 is defined as depicted in FIGS. 1 and 6. The hub 16 also includes an annular hub rim 70 having a cylindrical outer surface 72 and a cylindrical inner surface 74. The cylindrical outer surface 72 has a diameter of four inches, which is the standard outer hub surface diameter for motion picture film reels in the motion picture industry. The rim 70 is set radially outwardly from the core 63 and is joined thereto by eight radial spokes 76 formed as flat partitions that extend between the inner surface 74 of the hub rim 70 and the outer surface of the core 63. The radial spokes 76 divide the area between the core 63 and the rim 70 into sectors.

The radial spokes 76 extend axially in opposite directions from the web 78 to form panels 84 extending toward the side 20 of the hub 16 and panels 86 extending toward the side 18 of the hub 16. The hub 16 is also constructed with a web 78 that is oriented perpendicular to the axis of the hub 16. The web 78 extends radially outwardly from the cylindrical core 63 to the cylindrical outer surface 72 of the annular hub rim 70 throughout most of the annular area therebetween, and is formed with a pair of circular post receiving apertures 80 therethrough located diametrically opposite each other. The panels 84 and 86 extend radially inwardly from the outer cylindrical rim 70 of the hub 16 on both axial sides of the web 78.

The hub core 63 is formed with a radially outwardly extending channel 69 formed in the inner surface of its otherwise cylindrical annular wall. The channel 69 serves as a keyway that receives the keys 40 that extend radially outwardly from the bosses 38 of the side retainers 12 and 14. The keyway 69 serves as a locator guide on the hub 16 that is angularly offset ninety degrees from the post receiving apertures 80.

The alignment elements on the retaining members 12 and 14, namely the catches 54 and 56 and the keys 40, and the corresponding cooperating alignment elements on the hub 16, namely the post receiving apertures 80 and the keyway 69, prevent engagement of the posts 50 and 52 with the post receiving apertures 80 unless the cooperating alignment elements are within a minimum angular range of alignment with each other. This minimum range is established by the angular width of the post receiving apertures 80, the angular width of the keyway 69 and the width of the keys 40. Preferably, this angular range is about three degrees.

The diametrically opposed post receiving apertures 80 are each centered at a radial distance of about one inch from the axis of the hub 16. The post receiving apertures 80 also serve as guide apertures and locator holes to aid in aligning the retaining cheek-plate members 22 in a predetermined angular orientation relative to each other and relative to the hub 16 with respect to the axis of rotation 24 and in a mutually facing disposition. The web 78 prevents engagement of the retaining cheek-plate members 22 with the hub 16 unless the catches 54 and 56 are initially aligned with the post receiving apertures 80 and the side retainers 12 and 14 are pressed toward the hub 16 and toward each other.

The radially projecting keys 40 on the bosses 38 are somewhat narrower than the keyway 69 formed in the core 63 of the hub 16. The extent to which the width of the keyway 69 exceeds that of the keys 40 provides a side clearance to allow a slight rotational movement of the retaining cheek-plate members 12 and 14 relative to the hub as they are initially engaged together. This rotational movement is preferably limited to no greater than about five degrees, and typically is about three degrees.

Unless the catches 54 and 56 are longitudinally aligned with the post receiving apertures 80 and the keys 40 are longitudinally aligned within the angular confines of the keyway 69, the retaining members 12 and 14 cannot be engaged with the hub 16. Thus, proper angular alignment of the retaining members 12 and 14 relative to the hub 16 and relative to each other is assured.

To assemble the motion picture film reel 10, the side retainers 12 and 14 are disposed to respectively face the opposite sides 18 and 20 of the hub 16 in coaxial alignment therewith. In this disposition the inner surfaces 32 of the cheek-plate members 22 face each other.

One of the side retainers, for example the side retainer 14, may thereupon be advanced toward the hub 16 with the key 40 on the boss 38 thereof aligned with the keyway 69 in the hub 16. This alignment ensures that the centers of the posts 50 and 52 are also in substantial alignment with the post receiving apertures 80, but angularly offset therefrom very slightly, but only to the extent permitted by the amount by which the width of the keyway 69 exceeds the width of the keys 40. As a consequence, the catches 54 and 56 are initially in precise alignment with the post receiving apertures 80. Continued advancement of the retaining cheek-plate member 14 toward the hub 16 allows the catches 54 and 56 to pass through the post receiving apertures 80 and clear the opposite side of the web 78 from which they enter.

While the catches 54 and 56 of the side retainer 14 are aligned to pass through the post receiving apertures 80 in the web 78, the blocking member 68 of the side retainer 14 resides in longitudinal alignment with one of the eight radial spokes 76. However, since the latch arms 62 are resiliently flexible, advancement of the retaining cheek-plate member 14 toward the hub 16 can continue until the inner surface 32 of the cheek-plate member 14 meets the side 20 of the hub 16. This is possible since the longitudinal abutment of the blocking member 68 against the edge of the panel 86 of the aligned spoke 76 merely deflects the free end 66 of the latch arm 62 outwardly from the outer surface 34 of the planar cheek-plate members 22 as indicated by the directional arrow 88 in FIG. 7.

Figure 7:
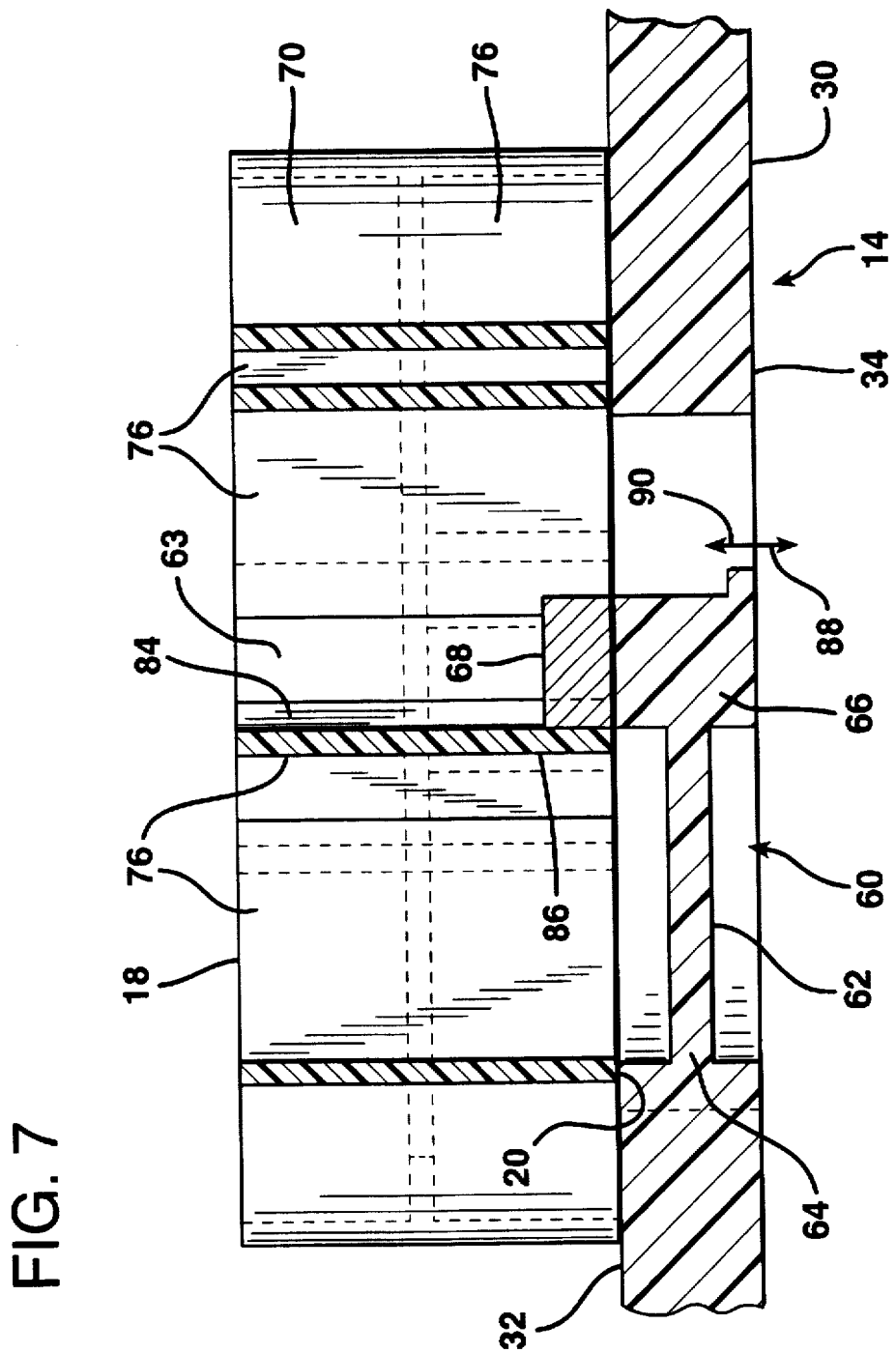
FIG. 7 is a sectional elevational detail taken along the lines 7—7 of FIG. 6.

Once the catches 54 and 56 have passed through the post receiving openings 80 in the web 78, the side retaining member 14 can be twisted slightly relative to the hub 16 about the axis 24. This twisting effect causes the protruding edges of the catches 54 and 56 remote from the posts 50 and 52 of the side retainer 14 to engage the opposite surfaces of the web 78 immediately adjacent the post receiving apertures 80 therethrough in the manner depicted in FIGS. 4 and 6. The twisting effect also results in the advancement of the latching element 60 of the side retainer 14 in a direction such that the blocking member 68 thereof becomes angularly offset from the panel 86 against which it initially resided in longitudinal abutment. As a consequence, the resilient nature of the latch arm 62 causes the free end 66 thereof to spring back into the plane of the cheek-plate member 22 of the side retainer 14, once the blocking member 68 clears the panel 86. The blocking member 68 springs back as indicated by the directional arrow 90 in FIG. 7 so as to reside in rotational abutment against the panel 86 with which it was initially in longitudinal abutment. Once the blocking member 68 springs back in rotational abutment against the panel 86 as depicted in FIG. 7, the latching element 60 of the side retainer 14 is in the latching position, thereby totally immobilizing the retaining member 14 relative to the hub 16.

Figure 4:
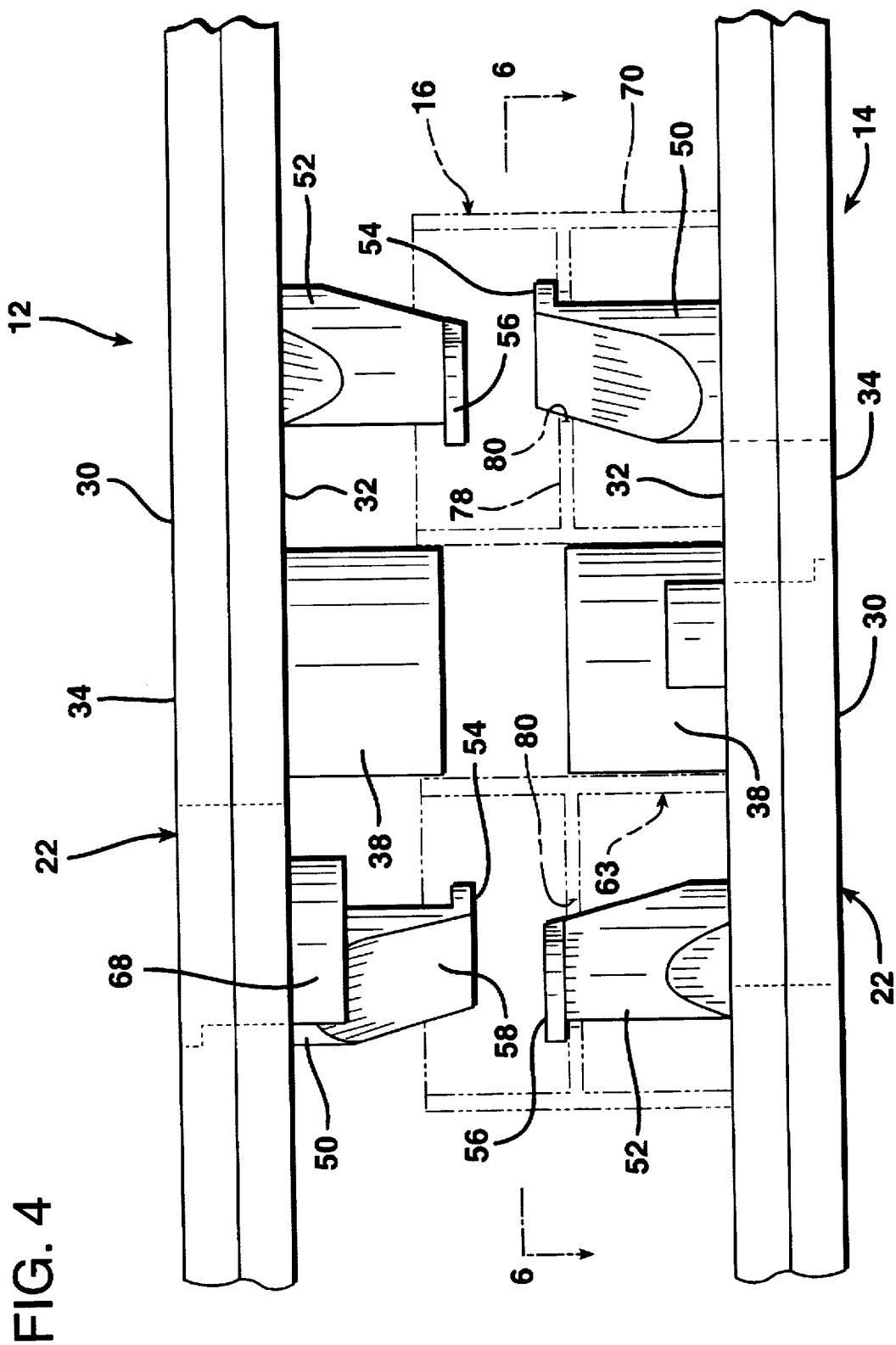
FIG. 4 is an elevational detail illustrating engagement of the lower side retainer of FIG. 1, with the hub shown in phantom, and the upper side retainer as it approaches engagement with the hub.
Figure 5:
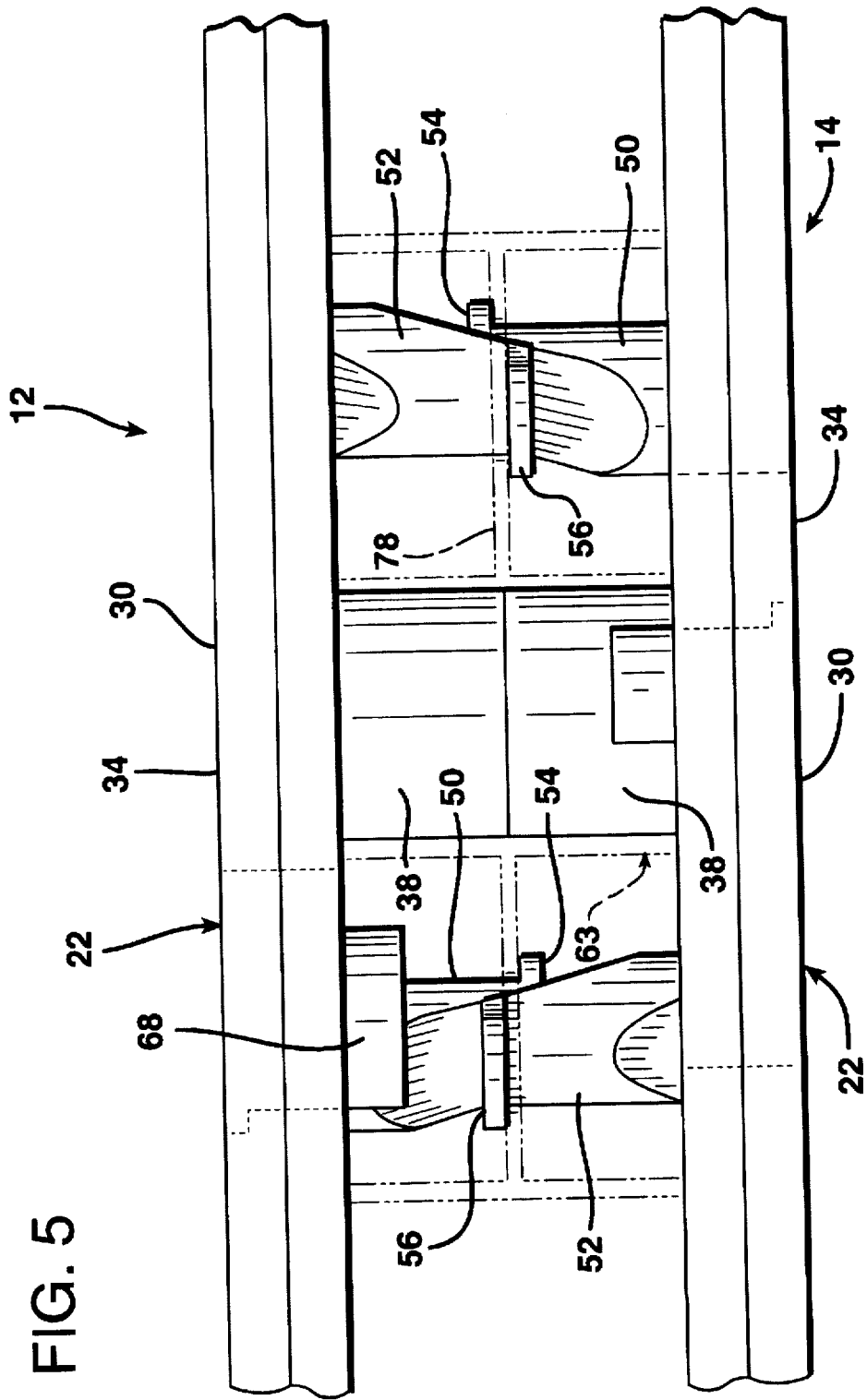
FIG. 5 is a side elevational detail illustrating both side retainers of the motion picture film reel of FIG. 1, engaged with the hub thereof, which is depicted in phantom.

The same process is then repeated with the side retainer 12, as depicted in FIGS. 4 and 5. That is, from the opposite side 18 of the hub 16 the side retainer 12 is coaxially aligned with and pressed toward the hub 16. The catches 54 and 56 of the posts 50 and 52 of the side retainer 12 are initially aligned with the post receiving apertures 80. With this angular orientation the key 40 of the boss 38 of the side retainer 12 is aligned with the keyway 69 on the side 18 thereof and the blocking member 68 of the latch arm 62 of the side retainer 12 resides in longitudinal abutment against the edge of the panel 84 of one of the spokes 76. At this point the side retainers 12 and 14 are angularly offset from each other slightly.

As the catches 54 and 56 of the side retainer 12 pass through the post-receiving openings 80 and clear the web 78, the cam surfaces 58 of the posts 50 and 52 the opposing retainers 12 and 14 make contact. The cam surfaces 58 are inclined at an angle of about sixty degrees relative to the planar inner surfaces 32 of the cheek-plate members 22. As the cam surfaces 58 meet in contact, they slide past each other, thereby twisting the retaining member 12 in an angular direction relative to the hub 16 opposite that of the retaining member 14, to the position illustrated in FIG. 5. This twisting motion causes the blocking member 68 on the deflected latch arm 62 of the side retainer 12 to be rotated past the panel 84 with which it initially resided in longitudinal abutment. As the blocking member 68 on the latch arm 62 of the side retainer 12 is rotated out of longitudinal alignment with the panel 84, it clears the edge of the panel 84. The resilient nature of the catch arm 62 thereupon presses the blocking member 68 inwardly toward the web 78 so that it assumes a position adjacent the panel 84. The blocking member 68 thereupon resides in abutment against the face of the panel 84, and prevents relative rotation between the hub 16 and the side retainer 12. The motion picture reel 10 is thereupon ready for use.

The component elements of the motion picture reel 10 will remain firmly locked together and immobilized relative to each other once the catches 54 and 56 have been engaged with the web 78 through the post receiving openings 80 therethrough, and the latching elements 60 have been moved to their engaged, latching positions. However, it is a simple matter to disengage the retaining elements 12 and 14 from each other and from the hub 16 if desired. To do this, it is necessary only for a user to insert fingertips through the elongated openings 61 and beneath the finger grip ledges 67. The user thereupon pulls the latch arms 62 outwardly in the direction of the directional arrow 88 illustrated in FIG. 7, away from the outer surfaces 34 of the cheek plates 22 until the blocking members 68 clear the outer edges of the spokes 76 against which they have theretofore resided in rotational abutment. The user's fingernails need merely engage the finger grip ledges 67 to move the latching elements 60 to their disengaged positions.

Once the latching elements 60 are in their disengaged positions, the retaining elements 12 and 14 are rotated in opposite directions relative to the hub 16. The radially outwardly projecting keys 40 on the bosses 38 are of a width that is narrow enough so that they may move within a narrow angle of rotation of about three degrees, within the confines of the keyway 69. The cam surfaces of the posts 50 and 52 thereupon slide past each other, thus bringing the catches 54 and 56 back into alignment with the post receiving openings 80 and pushing the retaining elements 12 and 14 out from the hub 16 and apart from each other. The retaining elements 12 and 14 can then be drawn apart from each other, since the catches 54 and 56 will clear the post receiving openings 80.

The side retaining members 12 and 14 need not necessarily be engaged with the hub 16 one at a time. In an alternative manner of assembly they can be concurrently engaged with the hub 16 and with each other.

In this alternative technique of assembly the side retaining members 12 and 14 are disposed in a mutually facing relationship in which the inner surfaces 32 of both of the cheek-plate members 22 face each other as depicted in FIG. 1. The side retaining members 12 and 14 are aligned along a mutual axis 24, with the hub 16 disposed therebetween, also axially aligned along axis 24. As the side retaining members 12 and 14 are advanced toward each other they are initially oriented relative to the hub 16 so that the catches 54 and 56 of each side retainer are longitudinally aligned with different portions of the post receiving apertures 80. When the catches 54 and 56 are aligned with the post receiving apertures 80, the keys 40 are also aligned so as to enter the keyway 69 from the opposite sides 18 and 20 of the hub 16, and in a slight angular displacement from each other.

Once the catches 54 and 56 pass through the post receiving apertures 80 and clear the web 78, the cam surfaces 58 of the posts 50 and 52 of the two side retaining members 12 and 14 make contact with each other. Continued advancement of the retaining members 12 and 14 toward each other causes the cam surfaces 58 to slide past each other. Since the cam surfaces 58 are radially offset from the axis 24, this sliding contact between the cam surfaces 58 causes both of the side retaining members 12 and 14 to rotate slightly relative to the hub 16, each in an opposite angular direction relative to the other. Both of the side retainers 12 and 14 are thereby concurrently twisted into positions of engagement with the hub 16.

With the twisting motion of the side retaining members 12 and 14 relative to the hub 16 as they are advanced toward each other, the blocking member 68 of each retaining member 12 and 14 rides in angular rotation across the edge of the radial spoke 76 with which it is initially in longitudinal abutment. The catches 54 and 56 of each retaining member engage the opposite surfaces of the web 78 with rotational movement of the retaining members 12 and 14 relative to the hub 16. The keys 40 travel in rotation within the limits imposed by the width of the keyway 69. The width of the keyway 69 is sufficient to accommodate the angular movement of the keys 14 therewithin.

As the keys 40 reach the limits of their movement allowed by the confines of the keyway 69, the blocking members 68 clear the spokes 76. The resiliency of the latch arms 62 thereupon causes the blocking members 68 to spring inwardly toward the web 78 with their rounded surfaces residing in abutting contact in opposite angular directions relative to the spokes 76 that they have just cleared.

If there is any further attempted angular rotation of the side retaining members 12 and 14 relative to the hub 16 in the directions of engagement, the rounded, cylindrical surfaces of the posts 50 and 52 located opposite the cam surfaces 58 thereof are brought into abutting contact against the edges of the post receiving apertures 80. As a consequence, further rotational movement in these directions is prohibited by the interfering contact between the posts 50 and 52 and the post receiving apertures 80.

At the same time counterrotation is prevented by the interfering abutment of the blocking members 68 against the radially extending panels 84 and 86 of the spokes 76. The latching elements 60 on each of the retaining members 12 and 14 are thereupon engaged in their latching positions with the hub 16 to prevent relative movement therebetween. The blocking member 68 located at the free end 66 of each latch arm 62 extends toward the web 78 and resides in abutment against a panels 84 or 86 when the latching element 60 is in the latching position. As a consequence, the side retaining members 12 and 14 are securely locked relative to each other and relative to the hub 16. The side retainers 12 and 14 and the hub 16 are thereupon totally immobilized relative to each other.

Once the latching elements 60 have been engaged, the catches 54 and 56 reside in an overlying relationship relative to the web 78. The engagement of the catches 54 and 56 in an overlying relationship relative to the web 78, coupled with the abutting relationship between the inner surfaces 32 of the check-plate members 22 and the sides 18 and 20 of the hub 16, prevent any axial movement of the component elements of the motion picture reel 10. As a consequence, the interfering relationship between the posts 50 and 52 and with the web 78 at the post receiving apertures 80 combined with the interfering relationship between the blocking members 68 and the spokes 76 prohibit any relative movement between the side retaining members 12 and 14 and the hub 16.

Figure 9:
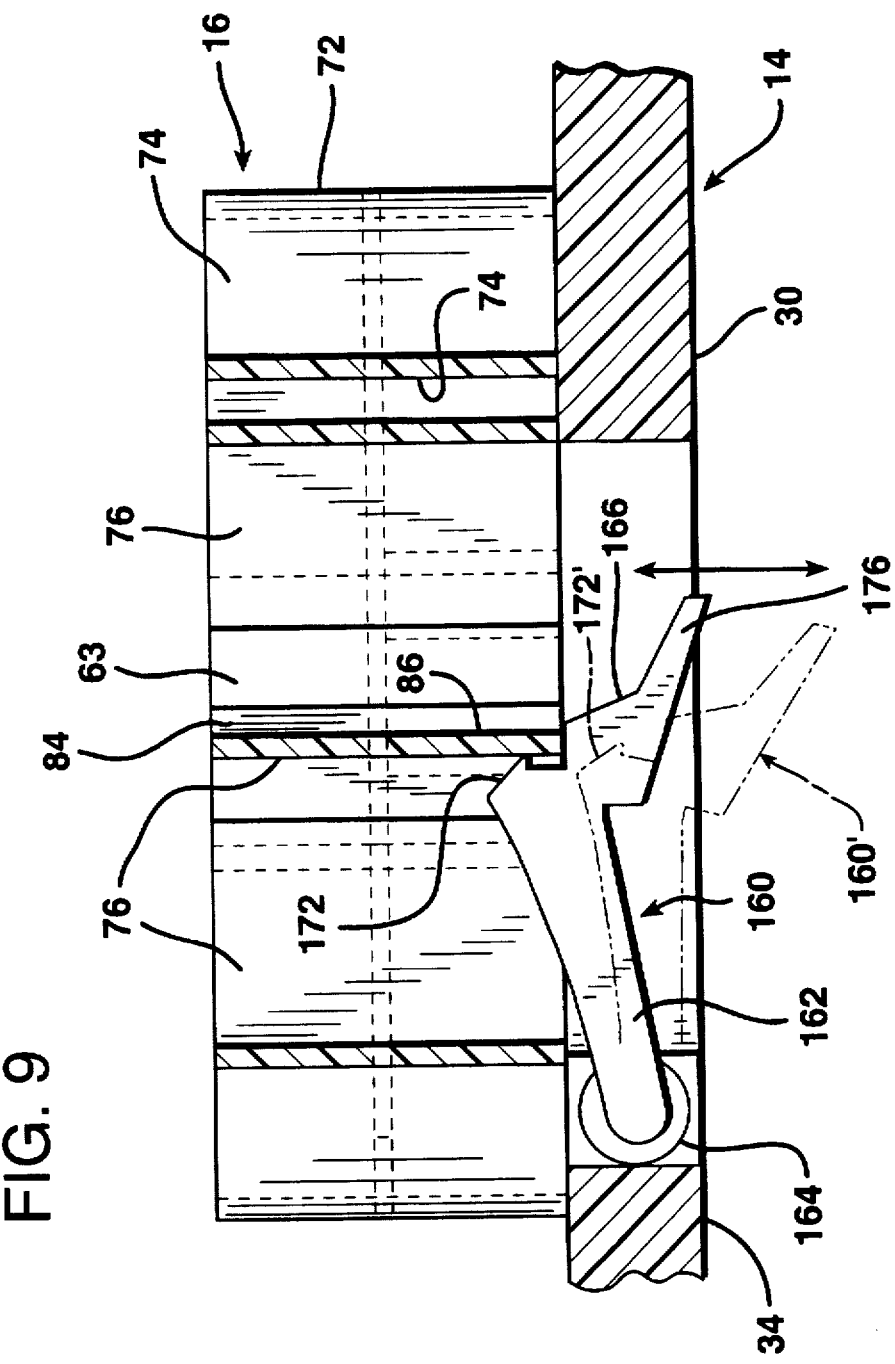
FIG. 9 is a side sectional detail showing an alternative latching mechanism to that depicted in FIG. 7 in solid lines in the latching position and in phantom in the disengaged position.
Figure 10:
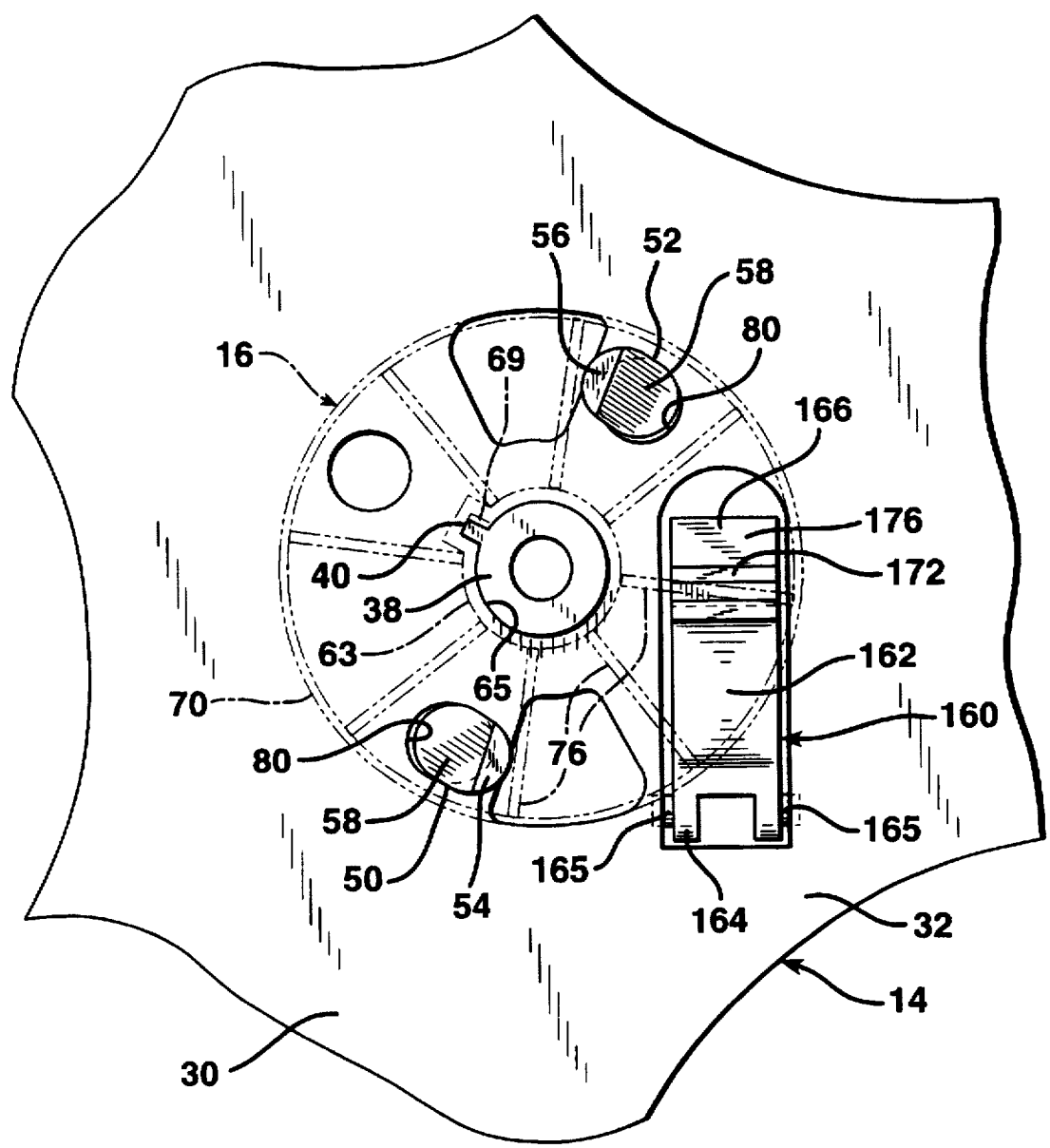
FIG. 10 is a plan view taken along the same plane as the view of FIG. 6 with respect to an embodiment of the motion picture film reel employing the latch mechanism of FIG. 9, also shown in the latched position.
Figure 11:
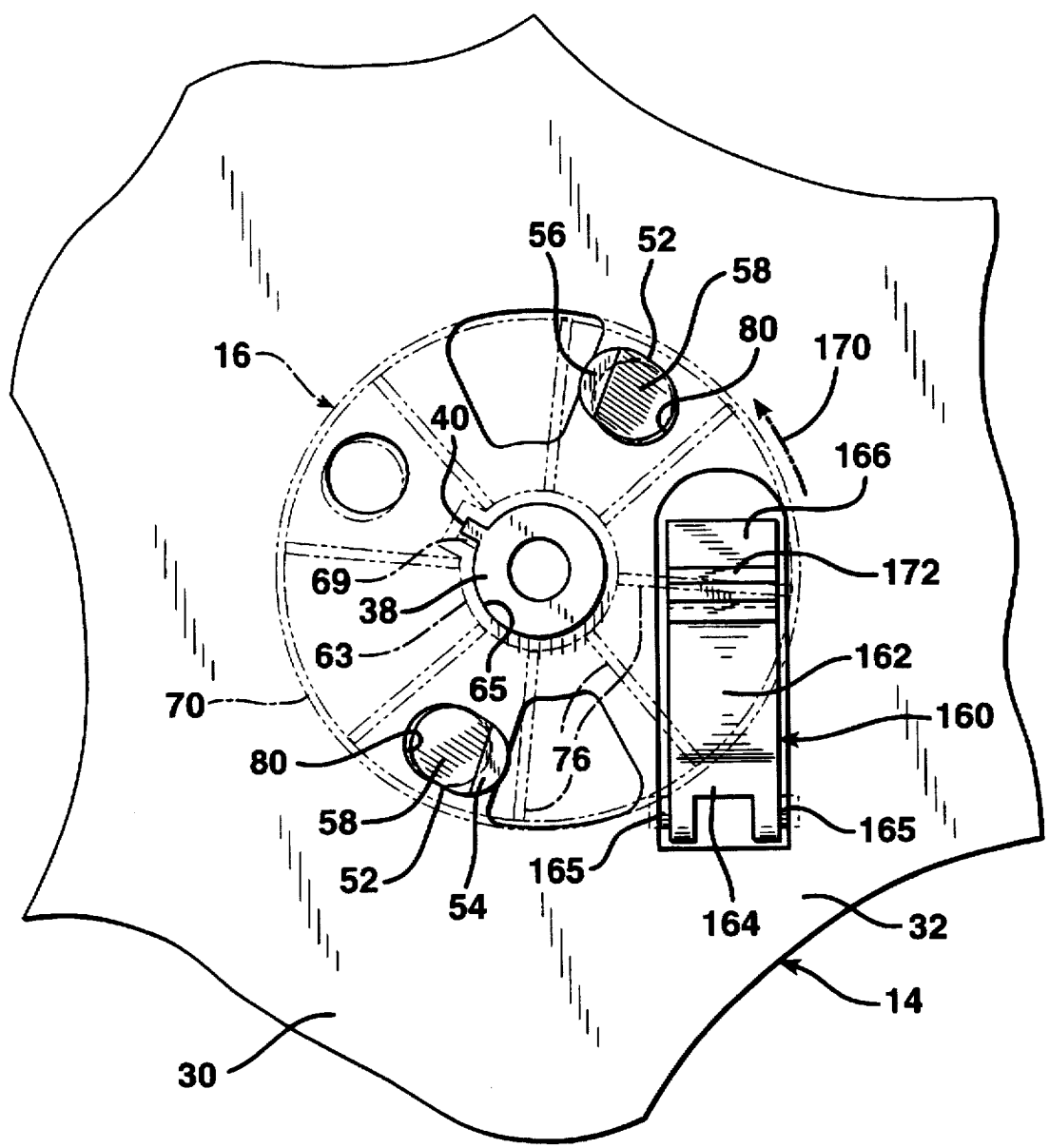
FIG. 11 is a plan view showing the latching mechanism of FIG. 10 in the disengaged position.

FIGS. 9, 10 and 11, illustrate a modified embodiment of the invention in which the latching element 160 differs somewhat from the latching element 60 depicted in FIGS. 1–8. Unlike the latching element 60, the latching element 160 is formed as a rigid structure having a rigid latch arm 162 with opposing first and second ends 164 and 166 respectively. The first hinged end 164 is provided with a pair of stub axles 165 that seat in corresponding recesses in the outer surfaces 34 of the cheek-plate members 22. The second free end 166 of the latching arm 62 terminates in a blocking lug or jaw 172 and a finger grip tab 176 that extends from the free end 166 of the latch arm 162 away from the first hinged end 164 thereof. The diameter of the stub axles 165 and the width of the recesses in which they are seated is tight enough so that the latch arm 162 is held by friction when it is moved to either the engaged position depicted in solid lines FIG. 9, or the disengaged position indicated at 160', indicated in phantom in that same drawing figure.

The rotation-inhibiting lug 172 is angularly offset from the posts 50 and 52, as illustrated in FIGS. 10 and 11 and is alternatively moveable between a latching position projecting out of the plane of the flat cheek-plate member 22 from the planar, inner surface 32 thereof as indicated in solid lines in FIG. 9, and a releasing or disengaged position withdrawn from the plane of the flat cheek-plate member 22 at the planar, inner surface 32 thereof, as indicated in phantom at 172' in FIG. 9. The rotation limiting panels of the spokes 76 on the opposite sides 18 and 20 of the hub 16 interact with the rotation-inhibiting lugs 172 to prevent relative rotation between the hub 16 and the retaining members 12 and 14 when the latch lugs 172 engage spokes 76, as depicted in FIGS. 9 and 10.

The latching element 160 on each of the retaining members 12 and 14 is moveable between a latching position projecting from the inner hub engagement region 30, inwardly toward the hub 16, as indicated in solid lines in FIGS. 9 and 10 and a withdrawn, disengaged position, indicated in phantom at 160' in FIG. 9.

To disengage the side retainers 12 and 14 from the hub 16 using the latching elements 160, the finger grip tabs 176 are merely pulled outwardly to the phantom position 160' indicated in FIG. 9. This draws the rotation-inhibiting lug 172 out of an angular interfering relationship relative to the spoke 76 and into the position indicated in phantom at 172' in FIG. 9. The side retainers 12 and 14 can then be counter rotated within the limits imposed by the keys 40 and keyway 69 and the posts 50 and 52 and the post receiving apertures 80. The side retaining members 12 and 14 can thereupon be axially withdrawn in opposite directions from the hub 16 as illustrated in FIG. 1. Motion picture film wound on the outer cylindrical surface 72 of the hub 16 can then be easily pushed axially and freed from the hub 16 and destroyed.

The operation of the latching element 160 is similar in many respects to the operation of the latching element 60, but differs in other respects. Specifically, to engage the side retaining members 12 and 14 with the hub 16, each latching arm 162 is first pulled out away from the outer surface 34 to the disengaged position 160', depicted in FIG. 9 by means of the finger grip tab 176. However, since there is no resilient force acting upon the latch arms 162, they will stay in the disengaged positions until purposefully returned to their engaged positions.

The side retaining members 12 and 14 are positioned relative to the hub 16 and advanced toward each other and toward the hub 16 as depicted in FIG. 1 and as previously described. The cam surfaces 58 and the posts 50 and 52, the keys 40 and the keyway 69 likewise interact in the manner previously described. The side retainers 12 and 14 are thereupon rotated slightly as they are advanced into engagement with the hub 16 from the position depicted in FIG. 11, as indicated by the direction of the directional arrow 170. The extent of rotation is normally limited to about three degrees. Once rotation is complete, the latching element 160 resides in the position depicted in FIG. 10, in which the jaw 172 has cleared the spoke 76.

The finger grip tab 176 at the free end 166 of each latch arm 162 is then pressed inwardly thereby rotating the latch arm 162 and the stub axles 165 relative to the cheek plates 22 inwardly toward the hub 16. The jaw 172 is thereupon brought into abutment in an angular direction against the face of one of the planar, radial panels of one of the spokes 76, located immediately adjacent thereto, as indicated in solid lines in FIG. 9 and also as indicated in FIG. 10.

Undoubtedly, numerous variations and modifications of the invention will become readily apparent to those familiar with motion picture film reels. Accordingly, the scope of the invention should not be construed as limited to this specific embodiments depicted and described.

We claim:

1. A motion picture film reel comprising: a pair of retaining members each formed with a flat, side cheek-plate member having a central axis of rotation, an outer circular perimeter, and an inner, hub-engaging region concentric relative to said axis of rotation, each retaining member also having a pair of diametrically opposed posts, each post extending normal to said cheek-plate member from said hub-engaging region thereof and having a catch thereon extending parallel to said cheek-plate member and at a tangential orientation in a common direction of angular displacement from said posts, each of said posts further defining a cam surface thereon oriented to face in a direction away from said catch thereon; and a disk-shaped hub having opposite sides, an annular outer cylindrical rim, and a transverse web extending radially inwardly therefrom and defining a pair of diametrically opposed post-receiving apertures therethrough, wherein said retaining members are disposed on said opposite sides of said hub with said posts of both of said retaining members projecting through said pair of post-receiving apertures from opposite sides of said hub and said cam surfaces of said posts of each of said retaining members reside in contact with said cam surfaces of said posts of each other of said retaining members, whereby said catches engage said web from opposite sides thereof.

2. A motion picture file reel according to claim 1 whereby said post-receiving apertures serve as locator holes and said web prevents engagement of said retaining members with said hub unless said catches are initially aligned with said post receiving apertures and said retaining members are pressed toward said hub and toward each other, and advancement of said retaining members toward each other causes said contacting cam surfaces to slide past each other thereby rotating said retaining members into angular alignment with each other.

3. A motion picture film reel according to claim 1 further comprising a latching element on each of said retaining members that is engageable with said hub to prevent relative movement therebetween.

4. A motion picture film reel according to claim 3 wherein said hub is comprised of at least one spoke extending radially inwardly from said outer cylindrical rim on both sides of said web, and said latching element on each of said retaining members is moveable between a latching position projecting from said inner hub-engaging region inwardly toward said hub thereby blocking rotation of said spoke and a withdrawn disengaged position.

5. A motion picture film reel according to claim 4 wherein each of said latching elements is comprised of a latch arm having one end fastened to said inner hub-engaging region and an opposite free end, and a blocking member located at said free end of said latch arm and extending toward said web and residing in abutment against said spoke when said latching element is in said latching position.

6. A motion picture reel having an axis of rotation and formed of separable and releasably engageable components including: a pair of laterally confining retaining members each including a planar portion that defines a central, hub-engaging region concentrically surrounded by a circular peripheral edge, and axial elements extending out from said central, hub-engaging region and including a pair of diametrically opposed posts each defining a catch thereon that extends parallel to said planar portion and in a first, common, angular direction relative to said axis of rotation; and a disk-shaped hub having opposite sides and having a central, cylindrical core, a cylindrical annular rim disposed concentrically about said core, and a transverse web extending between said core and said rim and defining a pair of diametrically opposing post receiving apertures therethrough which also serve as guide apertures to align said retaining members in a predetermined angular orientation relative to each other with respect to said axis of rotation and said retaining members are on said opposite sides of said hub and in a mutually facing disposition with their axial elements directed toward said hub so that said posts on each retaining member project through said post receiving apertures from opposite sides of said web and said catches on said posts of each retaining member extend in opposite angular directions relative to said catches on said posts of the other retaining member, and a latch mechanism is provided for each of said retaining members and is engageable to hold said catches in overlying relationship relative to said web and to immobilize each of said retaining members relative to said hub.

7. A motion picture reel according to claim 6 wherein said posts each also define a cam surface adjacent said catch thereon and said cam surface of each post slopes away from said catch thereon in an opposite, angular direction therefrom relative to said axis of rotation, whereby when said posts are aligned with said post-receiving apertures and said retaining members are advanced toward said hub and toward each other, said cam surfaces of said posts of each retaining member contact and slide past said cam surfaces of said posts of each other retaining member, thereby engaging said catches with said web at said post-receiving apertures therethrough.

8. A motion picture reel according to claim 7 wherein said latch mechanisms are both comprised of latch arms having first ends secured to said hub-engaging regions of said planar portions of said retaining members and second free ends, and each of said free ends carries an engagement member extending toward said hub, and said hub is provided with rotation limiting members on its opposite sides that interact with said engagement members to prevent relative rotation between said hub and said retaining members when said latch mechanisms are engaged.

9. A motion picture reel according to claim 8 wherein said rotation limiting members are comprised of spokes extending radially between paid core and said rim and on opposite surfaces of said web, whereby said spokes reside in rotationally interfering relationship with said engagement members when said latch mechanisms are engaged.

10. A motion picture reel according to claim 8 wherein said latch arms are securely anchored to said planar portions of said retaining members and are resiliently deflectable relative thereto.

11. A motion picture reel according to claim 8 wherein said latch arms are rigid structures and said first ends thereof are mounted to said planar portions of said retaining members by hinge connections at said hub-engaging regions thereof.

12. A motion picture reel according to claim 8 further comprising a hub locator element on said hub and retaining panel locator elements on each of said retaining members which are engageable with said hub locator element only when said retaining members are within a predetermined angular range of alignment relative to said hub.

13. A motion picture reel according to claim 12 wherein said core of said hub is hollow and said hub locator element is defined as a keyway therein, and said retaining panel locator elements are keys that are narrower than said keyway and extend into said keyway from said opposite sides of said hub.

14. A motion picture film reel according to claim 6 wherein said latch mechanisms are comprised of releasable latching elements on each of said retaining members and on said hub which are engageable to hold said retaining members angularly displaced from said hub in opposite directions of rotation such that said catches are engaged with said web and which are alternatively disengageable to permit separation of said retaining members from said hub.

15. A motion picture film reel according to claim 6 wherein said latch mechanisms are comprised of cooperating alignment elements on said retaining members and on said hub that prevent engagement of said posts with said post receiving apertures unless said cooperating elements are within a minimum angular range of alignment with each other.

16. A motion picture film reel comprising separate components that are releasably engageable together including: a pair of side retainers each formed with a flat member defining planar, inner and outer surfaces and with an outer circular perimeter defining a side retainer axis and a hub-engaging region centered within said perimeter and including a pair of posts radially displaced relative to said side retainer axis and located diametrically opposite each other and extending out of the plane of said inner surface thereof, each post defining a catch thereon extending parallel to the plane of said inner surface, and in the same angular direction relative to said side retainer axis, each side retainer further including at least one locator element extending out of the plane of said inner surface and a rotation inhibiting lug angularly offset from said posts and alternatively movable between a latching position projecting out of the plane of said inner surface of said flat member and a releasing position withdrawn from said inner surface of said flat, planar member and further comprising a disk-shaped hub having opposing sides and having a hollow central, cylindrical core, a cylindrical annular rim disposed concentrically about said core, and a transverse web extending between said core and said rim and defining a pair of post receiving apertures therethrough in diametrical opposition relative to said core, said hub further defining at least one locator guide and at least one latching element extending radially between said core and said rim and angularly displaced from said post receiving apertures, and said side retainers are disposed on opposite sides of said hub in coaxial alignment therewith with said inner surfaces of said flat members facing each other, and said posts of each of said side retainers project through said pair of post receiving apertures in said web and said locator elements of both of said side retainers extend into said at least one locator guide from said opposite sides of said hub, and said side retainers are rotated into angular alignment displaced in opposite angular directions relative to said hub, whereby said catches of said posts engage said web on opposing sides thereof, and said rotation inhibiting lugs are in abutment against said at least one latching element when in said latching position.

* * * * *